United States Patent

[11] 3,634,765

[72] Inventor Frank S. Gutleber
Little Silver, N.J.

[21] Appl. No. 10,038
[22] Filed Feb. 9, 1970
[45] Patented Jan. 11, 1972

[73] Assignee International Telephone and Telegraph Corporation
Nutley, N.J.

Continuation-in-part of application Ser. No. 647,154, June 19, 1967, now abandoned. This application Feb. 9, 1970, Ser. No. 10,038

[54] SYSTEM TO PROVIDE AN IMPULSE AUTOCORRELATION FUNCTION UPON LINEAR ADDITION OF A PLURALITY OF MULTIDIGIT CODE SIGNALS HAVING COOPERATING AUTOCORRELATION FUNCTIONS INCLUDING AMPLITUDE CONTROL OF THE DIGITS OF ONE OR MORE OF SAID CODE SIGNALS
10 Claims, 2 Drawing Figs.

[52] U.S. Cl. 325/42, 325/65, 325/324, 179/15 BC, 340/348
[51] Int. Cl. H04b 1/66, H04b 1/12, H04i 3/12
[50] Field of Search 340/348; 235/181; 325/42, 65, 323, 324, 326; 179/15 BC, 15 BY

[56] References Cited

UNITED STATES PATENTS

| | | | |
|---|---|---|---|
| 3,249,940 | 5/1966 | Erickson | 343/17.1 |
| 3,290,684 | 12/1966 | Renn et al. | 343/100 |
| 3,303,335 | 2/1967 | Pryor | 235/181 |
| 3,346,862 | 10/1967 | Raudsey | 343/113 |
| 3,432,619 | 3/1969 | Blasbalg | 179/15 |

*Primary Examiner*—Robert L. Richardson
*Assistant Examiner*—James A. Brodsky
*Attorneys*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

ABSTRACT: A pseudonoise multiplexed code class where at least one code signal of a group of two or more code signals has its amplitude controlled according to a given weighting factor at either the transmitter or receiver to adjust the autocorrelation function thereof to provide cooperating autocorrelation functions for the group of code signals so that when autocorrelation functions of the group of code signals are linearly added together, an output signal having an impulse autocorrelation function results.

| GROUP | CODE FORMAT | | | | | | | NUMBER OF CODE DIGITS(N) X AUTOCORRELATION FUNCTION [$\phi(t)$] | | | | | | | WEIGHTING FACTOR | $N\ \phi(t)$ PRIOR TO LINEAR ADDER 10 | | | | | | |
|---|---|---|---|---|---|---|---|---|---|---|---|---|---|---|---|---|---|---|---|---|---|---|
| I | 1 | 0 | 0 | 0 | 0 | 0 | 0 | +7 | +3 | +3 | +3 | +3 | +3 | +3 | $g_a$ OR $g'_a = 1/3$ | +7/3 | +1 | +1 | +1 | +1 | +1 | +1 |
| | 1 | 0 | 0 | 0 | 1 | 1 | 0 | +7 | −1 | −1 | −1 | −1 | −1 | −1 | $g_b$ OR $g'_b = 1$ | +7 | −1 | −1 | −1 | −1 | −1 | −1 |
| II | 1 | 0 | 0 | 0 | 0 | | | +5 | +1 | +1 | +1 | +1 | | | $g_a$ OR $g'_a = 1$ | +5 | +1 | +1 | +1 | +1 | | |
| | 1 | 1 | 0 | 0 | 0 | | | +5 | +1 | −3 | −3 | +1 | | | $g_b$ OR $g'_b = 1/2$ | +5/2 | +1/2 | −3/2 | −3/2 | +1/2 | | |
| | 1 | 0 | 1 | 0 | 0 | | | +5 | −3 | +1 | +1 | −3 | | | $g_c$ OR $g'_c = 1/2$ | +5/2 | −3/2 | +1/2 | +1/2 | −3/2 | | |

INVENTOR.
FRANK S. GUTLEBER
BY Alfred C. Hill
AGENT

SYSTEM TO PROVIDE AN IMPULSE AUTOCORRELATION FUNCTION UPON LINEAR ADDITION OF A PLURALITY OF MULTIDIGIT CODE SIGNALS HAVING COOPERATING AUTOCORRELATION FUNCTIONS INCLUDING AMPLITUDE CONTROL OF THE DIGITS OF ONE OR MORE OF SAID CODE SIGNALS

CROSS-REFERENCE TO RELATED APPLICATION

This application is a continuation-in-part of copending application, Ser. No. 647,154, filed June 19, 1967, and now abandoned.

BACKGROUND OF THE INVENTION

This invention relates to pulse signaling systems of the code type and more particularly to an improved autocorrelation technique for use in such pulse signaling systems.

Correlation techniques have been utilized in the past in signal-processing systems employing signals in the form of a pulse or a sequence of pulses. Such pulse signaling systems include, for example, radiant energy reflecting systems, such as radar, radio range finders, radio altimeters, and the like; pulse communication systems, such as over-the-horizon systems employing various types of scatter techniques, satellite communication systems and the like; and multiple-access systems employing address codes to enable utilization of the multiple-access system. Correlation techniques when employed in coded radiant energy reflection systems enhance the resolution of closely spaced reflecting surfaces and in addition, increase the average power transmitted. Correlation techniques employed in pulse communication systems result in increased signal-to-noise ratios without increase of transmitter power and minimize multiple-path effects (fading). Correlation techniques when employed in a multiple-access environment also result in increased signal-to-noise ratio without increase of transmitter power and if properly coded prevents or at least minimizes the interference or crosstalk between one or more address codes.

According to prior art correlation techniques the received signal is processed by obtaining the product of code elements of the received signal and code elements of a locally generated signal of the same waveform and period as the received signal and integrating the resultant product. The optimum output for such a correlation would be a single peak of high amplitude which has a width substantially narrower than the pulse width of the received signal. Most correlation systems in use today do not produce the desired optimum waveform, but rather provide an output whose waveform has spurious peaks in addition to the desired high-amplitude peak. The presence of these spurious peaks is undesirable in that the resolving power of radiant energy reflecting system is reduced, the signal-to-noise ratio of pulse communication systems and multiple-access systems and the minimization of multiple-path effects of pulse communication systems is reduced to a level below the optimum value.

Previously a number of improved correlation techniques have been proposed that will result in an impulse correlation function. The term "impulse correlation function," and more specifically, "impulse autocorrelation function," as employed herein, refers to a waveform having a single high-amplitude peak completely free from spurious peaks of lower amplitude elsewhere in the waveform.

Three proposed correlation techniques which are related to the present invention are fully disclosed in three copending applications of F. S. Gutleber Ser. No. 645,697, filed June 13, 1967, now U.S. Pat. No. 3,519,746, Ser. No. 671,382, filed Sept. 28, 1967, and Ser. No. 669,699, filed Sept. 22, 1967, now U.S. Pat. No. 3,461,451. These copending applications disclose a number of classes of codes and apparatus for producing the same general result. The classes of codes disclosed include a plurality of pairs of code signals, termed code mates, where the code mates have cooperating autocorrelation functions so that when they are detected and the resultant detected outputs are linearly added there is provided an impulse autocorrelation function having an impulse output at a given time and a zero output at all other times. The code mates generated are time or frequency multiplexed for transmission to the detector to provide long code sequences to increase the average transmitting power. The transmitted multiplexed code mates are separated consistent with the type of multiplexing being employed prior to detection and linear addition.

As disclosed in these copending applications there are only two codes forming code mates to produce upon detection and linear addition, due to their cooperating autocorrelation function, the desired output signal having an impulse autocorrelation function. In addition, the code mates had the same amplitude prior to linear addition, such as unity amplitude.

SUMMARY OF THE INVENTION

An object of this invention is to provide a pseudonoise multiplexed code class in addition to the pseudonoise multiplex code classes disclosed in the above-cited copending applications resulting in an output signal having an impulse autocorrelation function.

Another object of this invention is to provide a pseudonoise multiplexed code class in which the code signals have different amplitudes prior to combining to produce the desired output signal.

A further object of this invention is to provide a pseudonoise multiplexed code class including groups to two, three, or more code signals with the code signals of each group having their amplitudes predeterminedly weighted to produce upon combining thereof the desired output signal.

A feature of this invention is the provision of a system to provide an output signal having an impulse autocorrelation function comprising first means to generate a plurality of code signals each having different autocorrelation functions, second means coupled to the first means to control the amplitude of at least one of the code signals to adjust the autocorrelation function thereof for cooperation with the autocorrelation functions of the others of the code signals to produce when the code signals are combined the desired output signal, and third means coupled to the second means to combine the code signals and produce the desired output signal.

Another feature of this invention is the provision that the above-mentioned second means can be located in either the transmitter or receiver of the system.

BRIEF DESCRIPTION OF THE DRAWING

The above-mentioned and other features and objects of this invention will become more apparent by reference to the following description taken in conjunction with the accompanying drawings, in which.

DESCRIPTION OF THE PREFERRED EMBODIMENT

Figures 1, 2:
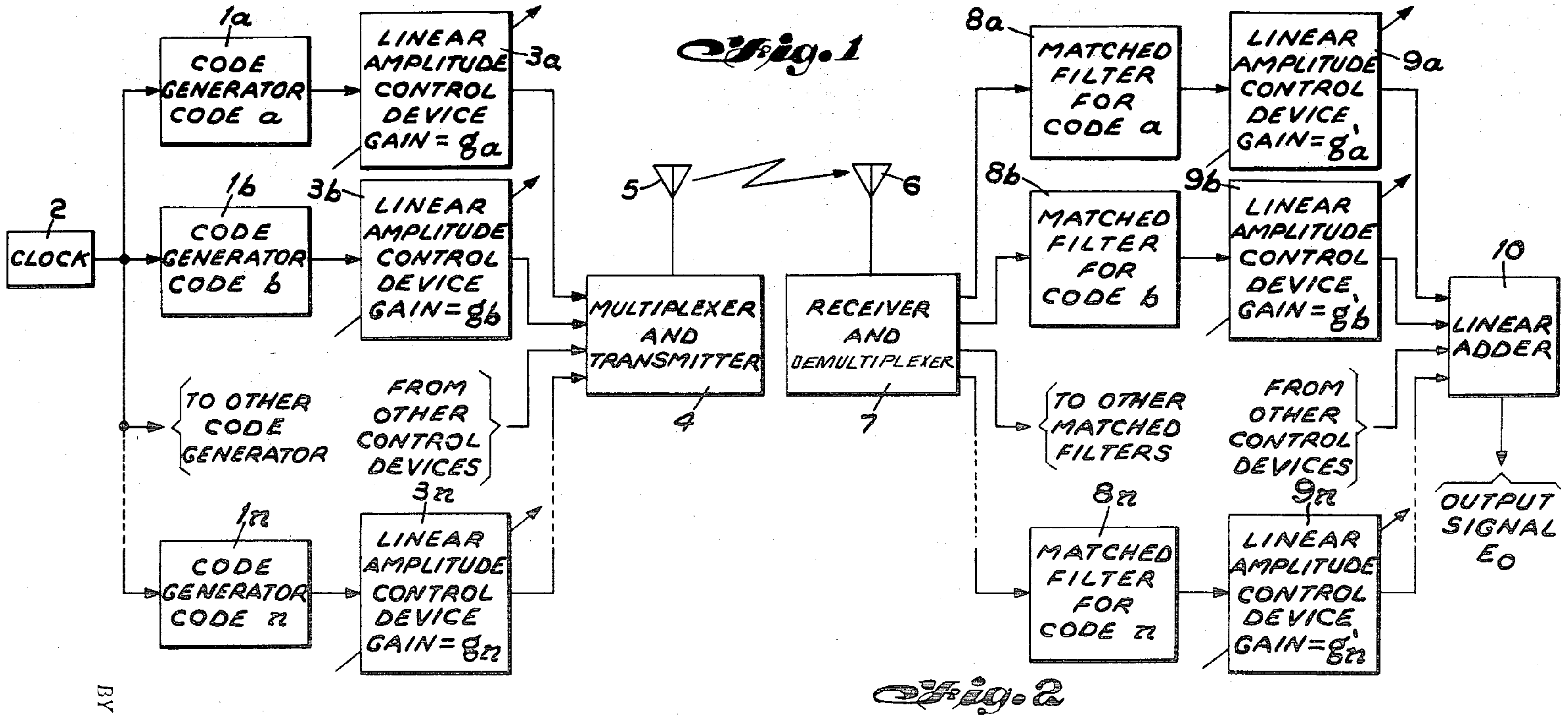
FIG. 1 is a block diagram of a system in accordance with the principles of this invention.
FIG. 2 is a tabulation of two groups of codes that can be employed in the system of FIG. 1.

Referring to FIG. 1, a system is illustrated in block diagram form which adds additional flexibility to the concept of multiplexed codes and code classes of the above-cited copending applications. The added flexibility provides many new codes having the proper autocorrelation function to produce upon linear addition an output signal having an impulse autocorrelation function and this is achieved by the additional linear operation of amplification or attenuation (amplitude control) of one or more code signals of a multiplexed group of code signals.

Code generators 1*a*, 1*b*, 1*n* driven by clock 2 produce code signals each of which have different autocorrelation functions. The output from each of the generators 1*a*–1*n* are coupled to their own linear amplitude control devices 3*a*, 3*b*, 3*n*. The output from devices 3*a*–3*n* are coupled to a multiplexer and transmitter 4 with the multiplexed group of code signals being transmitted from antenna 5 to antenna 6 for coupling to receiver and demultiplexer 7. The demultiplexed code signals are detected by an associated matched filter 8*a*, 8*b*, and 8*n*. The detected code signal outputs are then coupled to their own linear amplitude control devices 9*a*, 9*b*, 9*n*. The outputs of the control devices 9*a*–9*n* are coupled to linear adder 10 to provide the desired output signal having an impulse autocorrelation function.

In accordance with the principles of this invention, the impulse autocorrelation function is obtained by adjusting the amplitude of at least one of the code signals prior to linear addition in adder 10. This can be accomplished in accordance with the principles of this invention by control devices 3*a*–3*n* at the transmitter of the system or by control devices 9*a*–9*n* at the receiver of the system. The amplitude control at either location in the system is predeterminedly arranged to properly weight at least one code signal in the code group so that the autocorrelation functions of the code signals are in a cooperating relationship so that when they are linearly added in adder 10 the desired output signal having an impulse autocorrelation function results.

FIG. 2 illustrates two code mates that may be employed in the system of FIG. 1. The code format of these two groups are illustrated along with their autocorrelation function times the number of code digits, a weighting factor, and the resultant autocorrelation function times the number of code digits prior to linear adder 10 resulting from employing the weighting factor illustrated. The digit time slots having an *x* therein do not in any way constitute a portion of the code signal. This is merely to illustrate that the second group of code signals is a five-digit code signal rather than the seven-digit code signal of group I.

Referring to FIG. 2, the column labeled "Code Format" represents the code signals of two cooperating groups I and II of code signals. Each of the code signals is generated by one of the code generators 1 with each of the digits of a code signal having the binary condition as illustrated by the "1" and "0" in each time slot of the code format.

The autocorrelation $\phi_{aa}(t)$ times $N$, where $N$ is equal to the number of code digits in each of the cooperating code signals is computed mathematically by mathematical manipulation of the equation for the autocorrelation function $$\phi_{aa}(t)=(1/N)\sum_{n=1}^{n=N} a_n a_{(n+t)} \qquad (1)$$

This equation (1) is equation (9) in the above-cited copending application, Ser. No. 645,697. The results of the mathematical manipulation and, hence, the value of each term of the autocorrelation function of $\phi_{aa}(t)$, wherein $1/N$ has been eliminated by a multiplication of the autocorrelation function $\phi_{aa}(t)$ by $N$ are illustrated in the third column. Comparing the autocorrelation functions of the cooperating code signal of a group, such as group I, gives an indication of how to modify the amplitude of the digits of at least one of the code signals from their assumed given amplitude, such as unity, so as to provide cooperating autocorrelation function to enable achievement of an impulse autocorrelation output as defined herein. From observation of the value of the terms of the autocorrelation functions for the cooperating code signals of group I set forth in the third column of FIG. 2, the weighting factor (the gain), shown in the fourth column of FIG. 2 of device 3 or 9 associated with the first code signal has been determined to be one-third. When this weighting factor is mathematically combined with the autocorrelation function values in the third column of FIG. 2 there results as indicated in the fifth column of FIG. 2 the autocorrelation values of each term thereof times $N$ times the weighting factor. These values in column 5 of FIG. 2 are the values of the autocorrelation functions just prior to linear addition in adder 10 wherein the reduction in the autocorrelation function by the weighting factor of the first code of the cooperating code signal of group I or the second and third code signals of group II is accomplished by reducing the given amplitude of the binary "1" pulses in the code format to enable achieving the desired impulse autocorrelation function at the output of adder 10.

FIG. 2 illustrates two groups of code signals having cooperating autocorrelation functions so that multiplication by an appropriate weighting factor will produce cooperating autocorrelation functions prior to linear addition to bring about the desired impulse autocorrelation function at the output of adder 10. A person skilled in the art and employing equation (1) above can empirically find through trial and error method other cooperating code signal groups which will provide the desired cooperating autocorrelation functions capable of being employed with the system of FIG. 1 to provide the desired impulse autocorrelation function output signal.

It must be kept in mind that the matched filters 8 respond to their associated code signal so as to produce the code format of its associated signal at its output so that the amplitude of the various binary "1" digits may be modified in accordance with one embodiment of this invention to provide the cooperating autocorrelation functions. It must be kept in mind that the multiplication of the autocorrelation function by $N$ is performed mathematically with a chosen code format to enable determination of a cooperating code format having a cooperating autocorrelation function to produce the desired impulse autocorrelation function output signal. This mathematical process is done prior to operation of the system and does not represent a function of the matched filter. The matched filter is any type of correlation detector that will detect its associated code signal, for instance, a code signal having a code format as shown by the code format of the first code signal of group I of FIG. 2.

If group I codes are employed in the system of FIG. 1, only two channels would be needed for these code signals at both the transmitter and receiver end of the system. If the weighting is to be done at the transmitter control, device 3*a* would be adjusted to have an amplitude of one-third and the control device 3*b* would be adjusted to have a gain of one. With this arrangement control device 9*a* and 9*b* would be adjusted to have a gain of one. On the other hand, if it is desired to weight the code signals at the receiver end of the system control, device 3*a* and 3*b* would be adjusted for a gain of one, control device 9*a* would be adjusted to have a gain of one-third and device 9*b* would be adjusted to have a gain of one.

If the system of FIG. 1 were to be employed with the code signals of group II, three code signal channels would be required and the second and third code signals would be adjusted by a weighting factor of one-half with the first control signal having a weighting factor of one. This would means that if the control is to be accomplished at the transmitter, device 3*a* would be adjusted to have a gain of one and the devices 3*b* and 3*n* ($n=c$) would be adjusted to have a gain of one-half. In this instance the control devices 9*a*–9*n* would have their gain adjusted to one. On the other hand, if the control is to take place at the receiver, the control devices 3*a*–3*n* would have their gain adjusted to one, control device 9*a* would have its gain adjusted to one and control devices 9*b* and 9*n* ($n=c$) would have their gain adjusted to a value of one-half.

It is recognized that in general there is a slight loss in the detection efficiency introduced to amplitude weighting the code signals. The following will illustrate that the loss in detection efficiency is actually very slight and is not really a detrimental disadvantage since the additional number of groups of codes made available by this technique to achieve the desired output signal having an impulse autocorrelation function greatly offsets any loss in detection efficiency. Just how much loss in detection efficiency is incurred is readily established. The power received in each matched filter 8*a*–8*n* after demultiplexing would be $P_r=kg_n^2$. The voltage out of each matched filter preceding linear adder 10 would therefore be given by:

$$E_n=k'g_ng'_n \qquad (1)$$

And since all the signal voltages preceding adder 10 are coherent and correlated the output signal from linear adder 10 would be $$E_o=k'[g_a g'_a+g_b g'_b+\ldots+g_n g'_n] \quad (2)$$

Since the noise voltages out of matched filters 8a–8n are uncorrelated, their powers would add linearly resulting in a total output noise voltage of $$N_o=k''\sqrt{g'^2_a+g'^2_b+\ldots+g'^2_n} \quad (3)$$

This yields an output signal-to-noise power ratio of $$\left(\frac{P}{N}\right)_o=k'''\frac{[g_a g'_a+g_b g'_b+\ . \ . \ .\ +g_n g'_n]^2}{g'^2_a+g'^2_b+\ . \ . \ .\ +g'^2_n} \quad (4)$$

Now an optimum system would have:

$$g_a=g_b=\ldots=g_n=1$$
$$g'_a=g'_b=\ldots=g'_n=1$$

Resulting in:

$$\left(\frac{P}{N}\right)_{o_{opt.}}=k'''\frac{n^2}{n}=k'''_n \quad (5)$$

Therefore, the transmission efficiency *TE* of the proposed system referenced to an optimum correlation detection system is $$TE=\frac{\left(\frac{P}{N}\right)_o}{n} \quad (6)$$

Also, the total transmitting power must be the same for both the proposed and optimum system in order for the above efficiency equation to be meaningful. Or, $$g_a^2+g_b^2+\ldots+g_n^2=n \quad (7)$$

Hence:

$$TE=\frac{[g_a g'_a+g_b g'_b+\ . \ . \ .\ +g_n g'_n]^2}{[g_a^2+g_b^2+\ . \ . \ .\ +g_n^2][g'^2_a+g'^2_b+\ . \ . \ .\ +g'^2_n]} \quad (8)$$

Consider the following practical example to determine how much loss might be incurred in an actual system. Consider:

$g_a=g_b=1$
$g_c=g_d=\ldots=g_n=0$
$g'_a=½$
$g'_b=1$

Then:

$$TE=(1+½)^2/2(1+¼)=0.9$$

or approximately 0.5 db.

When one amplitude is attenuated by as much as 50 percent, there is a loss of only 0.5 db. For a ratio of 3 to 1 between $g'_a$ and $g'_b$ the efficiency is 0.8, or a loss of approximately 1 db. results.

As pointed out hereinabove, the cooperating code signal groups can be employed with a number of systems, for instance, a radiant energy reflecting system to improve the resolving power thereof and a multiple access system to improve the signal-to-noise ratio and crosstalk between two cooperating code groups, each of which represents an address signal. The adjusted-amplitude code signals in accordance with the present invention may be employed as the code mates of the cited copending applications to bring about the desired improvement. Namely, assuming, that the two code signals of group I of FIG. 2 is to be employed in a radiant energy reflecting system. The two code signals would be multiplexed on a frequency or time basis to provide the desired long code sequence which operates to increase the average transmitting power. These multiplexed code signals are transmitted and reflected from a reflecting object for receipt in the receiver which includes therein a cooperating arrangement to demultiplex the two code signals previously multiplexed and transmitted. These two demultiplexed code signals are then detected by their associated correlation detectors and the amplitude of the digits of one predetermined code signal is adjusted by a predetermined value prior to linear addition. Of course, in accordance with the principles of this invention the amplitude adjustment may be accomplished before multiplexing. The resulting output signal will then have the desired optimum output, namely, a single peak of high amplitude completely free from spurious peaks of lower amplitude elsewhere in the waveform which is the impulse autocorrelation function as defined herein and the cited copending applications.

When the system of this invention is employed in a multiple access system the cooperating code signals of a code group, such as group I of FIG. 2 forms the address of the station wishing access either of a multiple-access communication system or a multiple-access computer system. These systems would include an arrangement as shown in the receiver terminal of FIG. 1 to respond to the address. The characteristics of the cooperating code signals of a code group enable an improved signal-to-noise ratio for detecting the address and minimum interference with other addresses of similar type that may also be applied to the multiple-access system. As in the radiant energy reflecting system, the two cooperating code signals are multiplexed on a time or frequency basis and transmitted to a remote receiver wherein the two cooperating code signals are demultiplexed and applied to their associated correlation detector. The amplitude of the binary "1" digits of at least one code signal of the group is appropriately adjusted before transmission or after reception to provide cooperating autocorrelation function so that when the code signal inputs to a linear adder are linearly added there is provided an output signal having an impulse autocorrelation function.

While I have described above the principles of my invention in connection with specific apparatus it is to be clearly understood that this description is made only by way of example and not as a limitation to the scope of my invention as set forth in the objects thereof and in the accompanying claims.

I claim:

1. A system to provide an output signal having an impulse output at a given time and a zero output at all other times comprising:
   a clock source;
   a plurality of separate code generators coupled in common to said source, each of said generators generating a different discrete predetermined code signal having a plurality of digits of predetermined binary condition, one of said binary conditions being represented by a pulse having a given amplitude, and each of said code signals having a different autocorrelation function, the autocorrelation functions of each of said code signals having a predetermined relationship;
   a plurality of analog amplitude control means, each of said control means being coupled to a different one of said generators, at least one of said control means being selected to have a given gain different than one but related to the relationship between the autocorrelation functions of said code signals and the other of said control means having a gain of one, said selected one of said control means controlling the amplitude of each of the digits in said one of said binary conditions of its associated one of said code signals to adjust the autocorrelation function thereof for cooperation with the autocorrelation functions of the others of said code signals to produce, when said code signals are linearly added together, said output signal; and
   first means coupled in common to said plurality of said control means to linearly add said code signals and produce said output signal.
2. A system according to claim 1, wherein
   said first means includes
   a linear adder.
3. A system according to claim 1, further including
   a transmitter coupled in common to said plurality of said control means,
   a receiver,
   a propagation medium interconnecting said transmitter and said receiver, and
   a plurality of detectors, one for each of said code signals, coupled between said receiver and said first means.
4. A system according to claim 3, wherein said first means includes
a linear adder coupled in common to each of said detectors.

5. A system according to claim 3, wherein
each of said detectors includes
a matched filter type code signal detector.

6. A system according to claim 1, further including
a transmitter coupled in common to said plurality of said code generators,
a receiver,
a propagation medium interconnecting said transmitter and said receiver, and
a plurality of detectors, one for each of said code signals, coupled between said receiver and said plurality of control means.

7. A system according to claim 6, wherein
each of said detectors includes
a matched filter type code signal detector.

8. A system according to claim 6, wherein
said first means includes
a linear adder coupled in common to each of said control means.

9. A system according to claim 1, wherein
said code signals number two, and
said selected control means number one.

10. A system according to claim 1, wherein
said code signals number three, and
said selected control means number two.

* * * * *